United States Patent
Matsuda

(10) Patent No.: US 9,377,848 B2
(45) Date of Patent: Jun. 28, 2016

(54) IMAGE PROCESSING APPARATUS, CONTROL METHOD THEREOF, AND RECORDING MEDIUM FOR PERFORMING DATA TRANSMISSION

(71) Applicant: CANON KABUSHIKI KAISHA, Tokyo (JP)

(72) Inventor: Jun Matsuda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 215 days.

(21) Appl. No.: 13/748,472

(22) Filed: Jan. 23, 2013

(65) Prior Publication Data

US 2013/0201351 A1 Aug. 8, 2013

(30) Foreign Application Priority Data

Feb. 3, 2012 (JP) ................................ 2012-022152

(51) Int. Cl.
 *H04N 5/232* (2006.01)
 *G06F 3/00* (2006.01)
 *H04N 1/00* (2006.01)
 *H04N 1/333* (2006.01)
 *H04N 101/00* (2006.01)

(52) U.S. Cl.
 CPC ............ *G06F 3/005* (2013.01); *H04N 1/00307* (2013.01); *H04N 1/00347* (2013.01); *H04N 1/333* (2013.01); *H04N 1/00453* (2013.01); *H04N 1/00458* (2013.01); *H04N 1/00461* (2013.01); *H04N 1/00477* (2013.01); *H04N 5/23206* (2013.01); *H04N 5/23245* (2013.01); *H04N 2101/00* (2013.01); *H04N 2201/0015* (2013.01); *H04N 2201/0084* (2013.01)

(58) Field of Classification Search
 None
 See application file for complete search history.

(56) References Cited

U.S. PATENT DOCUMENTS

| 8,471,912 | B2 * | 6/2013 | Yoneyama et al. ......... 348/207.1 |
| 2006/0082821 | A1 * | 4/2006 | Yamaya ................. H04N 5/772 358/1.15 |
| 2006/0109349 | A1 * | 5/2006 | Takashima ............ G06F 13/385 348/207.1 |
| 2006/0143716 | A1 * | 6/2006 | Ikemoto ......................... 726/27 |
| 2009/0040331 | A1 * | 2/2009 | Kitagawa ................... 348/222.1 |
| 2009/0300239 | A1 * | 12/2009 | Hubo .................... G06F 13/426 710/63 |
| 2010/0271491 | A1 * | 10/2010 | Yasuda ....................... 348/207.1 |
| 2010/0306827 | A1 * | 12/2010 | Esteve Balducci et al. ....... 726/4 |
| 2011/0310258 | A1 * | 12/2011 | Ohmura ..................... 348/207.1 |
| 2012/0032795 | A1 * | 2/2012 | Ishii et al. .................. 340/539.1 |
| 2013/0120592 | A1 * | 5/2013 | Bednarczyk et al. ...... 348/207.1 |

FOREIGN PATENT DOCUMENTS

JP  2009-44251 A  2/2009

* cited by examiner

*Primary Examiner* — Roberto Velez
*Assistant Examiner* — Quan Pham
(74) *Attorney, Agent, or Firm* — Canon USA, Inc. IP Division

(57) ABSTRACT

An image processing apparatus includes a control unit configured to control a transmission of an image to an external device, a shifting unit configured to shift a mode between an operation mode and a standby mode, a selection unit configured to select whether to permit shifting to the standby mode based on a user operation, and a determination unit configured to determine a type of the external device, wherein in a case where the determination unit determines that the type of the external device is a first type, the control unit enables transmission of an image to the external device in a mode associated with the first type without selection, and wherein in a case where the determination unit determines that the type of the external device is a second type, the control unit enables transmission of an image to the external device after selection.

19 Claims, 16 Drawing Sheets

FIG.5

| CONNECTION INFORMATION NO. | | 1 | 2 | 3 | 4 | 5 | 6 | ... | N |
|---|---|---|---|---|---|---|---|---|---|
| WIRELESS LAN PARAMETER | ESSID | AP1 | AP1 | Adhoc1 | AP3 | AP | – | | – |
| | BSSID | 0059AB1228DC | 0059AB1228DC | – | 0047993AB2A4 | 00682C31A822 | – | | – |
| | AUTHENTICATION METHOD | WPA2 | WPA2 | WEP | WPA | WPA2 | – | | – |
| | ENCRYPTION TYPE | AES | AES | OPEN | TKIP | TKIP | – | | – |
| | ENCRYPTION KEY | abcdefgh | abcdefgh | 12345 | a1b2c3d4 | stuvwxyz | – | | – |
| | CHANNEL | 1 | 1 | 3 | 5 | 8 | – | | – |
| NETWORK SETTING INFORMATION | IP ADDRESS ACQUISITION | Auto | Auto | Auto | Auto | Manual | – | | – |
| | DNS ACQUISITION | Auto | Auto | Auto | Manual | Manual | – | | – |
| CONNECTION DEVICE INFORMATION | CONNECTION TYPE | SMARTPHONE | PC | SMARTPHONE | SMARTPHONE | SERVER | – | | – |
| | NAME OF CONNECTION DEVICE | SmartPhoneA | PC1 | SmartPhoneB | SmartPhoneC | – | – | | – |
| | UUID | 0000-ABCD-EFGH | 0011-AAAA-BBBB | 0000-IJKL-MNOP | 0000-1234-5678 | – | – | | – |
| | BROWSE PERMISSION INFORMATION | PERMISSION | PERMISSION | PERMISSION | PROHIBITION | – | – | | – |

WAITING FOR RECEPTION ...

FIG.16

| EXTERNAL DEVICE \ CORRESPONDING MODE | OPERATION MODE | STANDBY MODE |
|---|---|---|
| DIGITAL CAMERA | PROHIBITION | PERMISSION |
| PC | PERMISSION | PROHIBITION |
| CELL PHONE | PERMISSION | PERMISSION |

IMAGE PROCESSING APPARATUS, CONTROL METHOD THEREOF, AND RECORDING MEDIUM FOR PERFORMING DATA TRANSMISSION

BACKGROUND OF THE INVENTION

1. Field of the Invention

The present invention relates to an image processing apparatus configured to connect with another device to perform data transmission.

2. Description of the Related Art

Recently, a digital camera which includes a wireless communication function and is capable of transmitting image data acquired by image capturing to an external device has been known. There are two methods for selecting image data to be transmitted from such a digital camera to an external device. The methods are described below.

One is a method in which image data to be transmitted to the external device is selected at the digital camera side. The other is a method in which image data in the digital camera is released to the external device and image data that the user wants to acquire is selected at the external device side.

For example, Japanese Patent Application Publication No. 2009-44251 discusses a digital camera which includes both methods and a user can select which method is to be used. However, in the technique discussed in Japanese Patent Application Publication No. 2009-44251, the user is required to select whether to release image data to the public every time the connection is established.

SUMMARY OF THE INVENTION

According to an aspect of the present invention, an image processing apparatus capable of communicating with an external device includes a recording unit configured to record an image in a recording medium, a control unit configured to control a transmission of the image to the external device, an operation unit configured to receive an instruction from a user, a shifting unit configured to shift a mode between an operation mode for receiving an instruction to transmit an image to the external device via the operation unit and a standby mode for receiving an instruction from the external device to transmit an image to the external device, a selection unit configured to select whether to permit shifting to the standby mode based on a user operation, and a determination unit configured to determine a type of the external device, wherein, in a case where the determination unit determines that the type of the external device is a first type, the control unit enables transmission of the image to the external device in a mode associated with the first type without selection performed by the selection unit based on the user operation, and wherein, in a case where the determination unit determines that the type of the external device is a second type, the control unit enables transmission of the image to the external device after selection is performed by the selection unit based on the user operation.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates a conceptual diagram of a database included in the image processing apparatus according to the first exemplary embodiment.

FIG. 16 is a conceptual diagram of a database included in the image processing apparatus according to the second exemplary embodiment.

DESCRIPTION OF THE EMBODIMENTS

Various exemplary embodiments, features, and aspects of the invention will be described in detail below with reference to the drawings.

Figure 1:
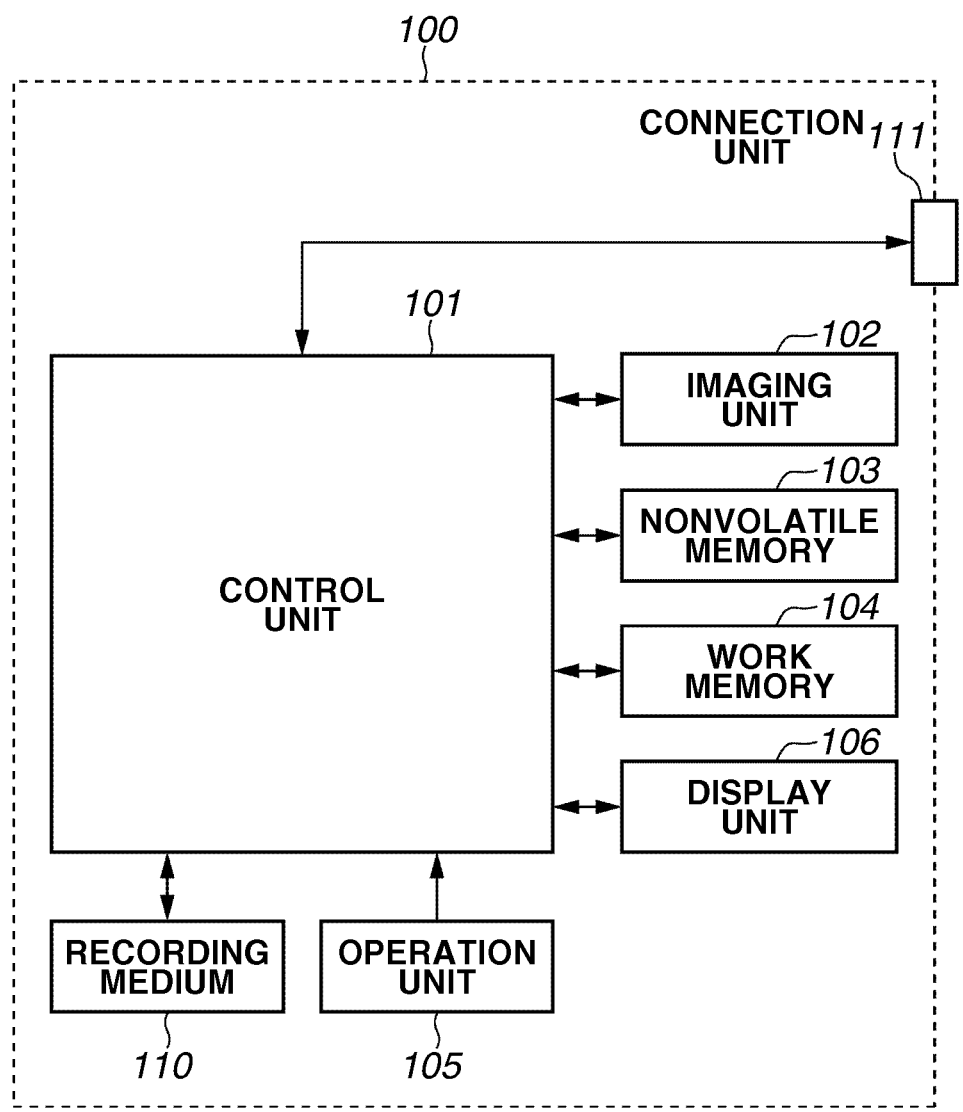
FIG. 1 is a block diagram illustrating a configuration of an image processing apparatus according to a first exemplary embodiment.

FIG. 1 is a block diagram illustrating an example of a configuration of a digital camera 100 as an example of an image processing apparatus according to a first exemplary embodiment. A digital camera is exemplified here as the image processing apparatus, however, the image processing apparatus is not limited to the digital camera. For example, the image processing apparatus may include an information processing apparatus such as a cell phone, a tablet device, and a personal computer, or alternatively, may be an imaging apparatus such as a camera-equipped cell phone.

A control unit 101 controls each unit of the digital camera 100 according to an input signal or a program described below. The control unit 101 may control the entire apparatus or a plurality of pieces of hardware may control the entire apparatus by sharing processing therebetween.

An imaging unit 102 converts object light of which image is formed by a lens included in the imaging unit 102 into an electric signal, performs noise reduction processing or the like on the converted electric signal, and outputs the resulting digital data as image data. Captured image data is stored in a buffer memory and then subjected to a predetermined calculation by the control unit 101 to be recorded in a recording medium 110.

A nonvolatile memory 103 is an electrically deletable and recordable nonvolatile memory in which, for example, the below described program to be executed by the control unit 101 is stored.

A work memory 104 is used as, for example, a buffer memory for temporarily storing image data captured by the imaging unit 102, an image display memory of a display unit 106, and a work area of the control unit 101.

An operation unit 105 is used to receive an instruction input to the digital camera 100 from a user. The operation unit 105 includes operation members such as a power button for allowing the user to instruct power ON/OFF of the digital camera 100, a release switch for instructing of image capturing, and a reproduction button for instructing reproduction of image data. The operation unit 105 further includes a touch panel formed on the display unit 106 described below.

The release switch includes a SW1 and a SW2. A half-press of the release switch causes the SW1 to turn ON. Accordingly, the control unit 101 receives an instruction to prepare for image capturing, such as auto-focus (AF) processing, automatic exposure (AE) processing, automatic white balance control (AWB) processing, and electronic flash preliminary emission (EF) processing. A full-press of the release switch causes the SW2 to turn ON. Accordingly, the control unit 101 receives an instruction to capture an image.

A display unit 106 displays a view finder image while capturing image, the captured image data, and characters for enabling an interactive operation. The digital camera 100 is not always required to include the display unit 106. The digital camera 100 can connect with the display unit 106 and may include at least a display control function for controlling display of the display unit 106.

A recording medium 110 can record image data output from the imaging unit 102. The recording medium 110 may be detachably installed in the digital camera 100 or may be built in the digital camera 100. In other words, the digital camera 100 may include at least means for accessing the recording medium 110.

A connection unit 111 is an interface for connecting the digital camera 100 to an external device. The digital camera 100 according to the present exemplary embodiment can exchange data with the external device via the connection unit 111. According to the present exemplary embodiment, the connection unit 111 may be an antenna, and the control unit 101 can connect with the external device via the antenna.

As described above, the digital camera 100 is structured.

A cell phone 200 as an example of the external device is described below.

Figure 2:
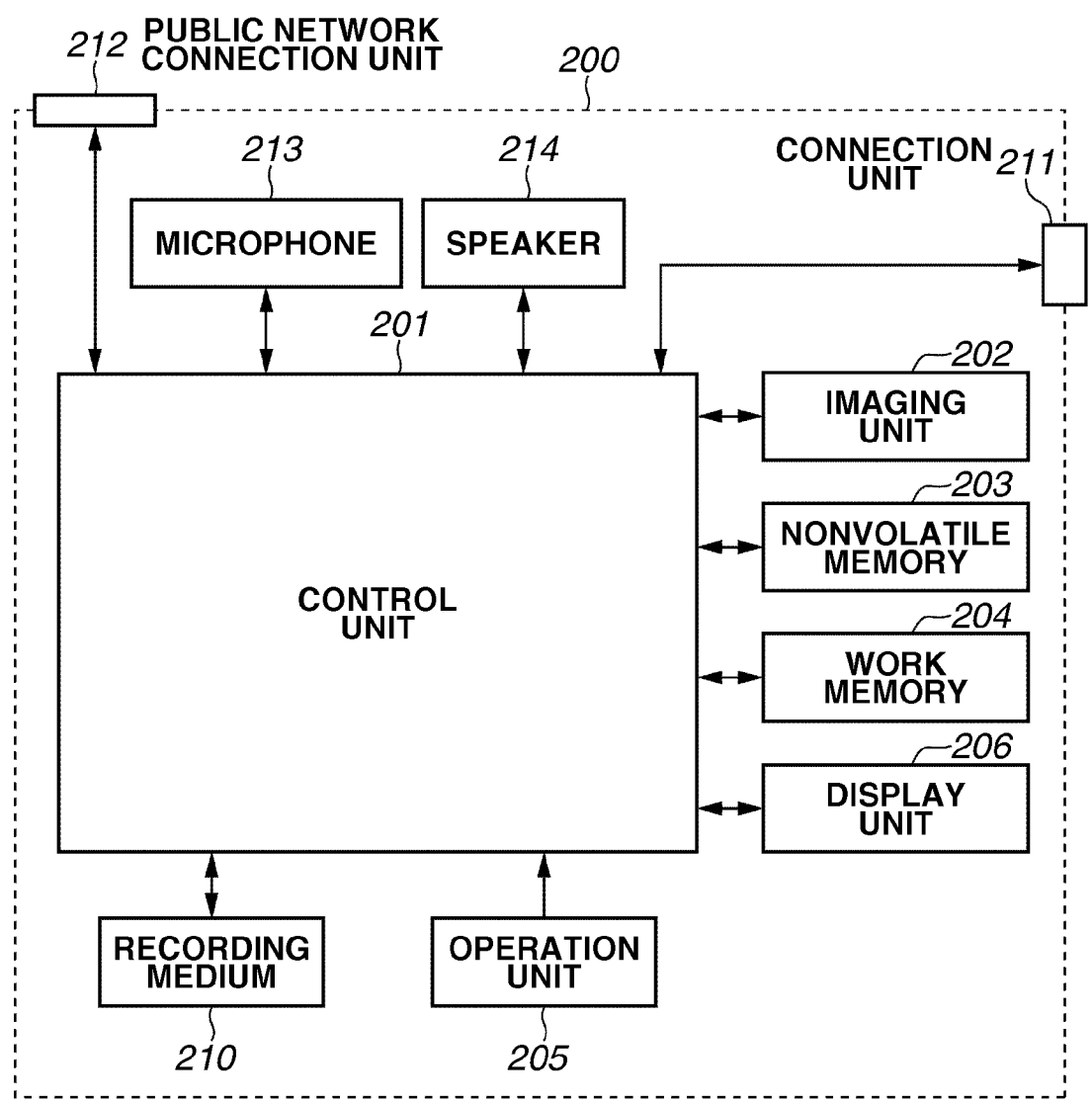
FIG. 2 is a block diagram illustrating a configuration of an external device according to the first exemplary embodiment.

FIG. 2 is a block diagram illustrating an example of a configuration of the cell phone 200 as an example of the external device according to the present exemplary embodiment. A cell phone is exemplified here as the external device, however, the external device is not limited to the cell phone. For example, the external device may include a wireless-communication function equipped digital camera, a tablet device, or a personal computer.

A control unit 201 controls each unit of the cell phone 200 according to an input signal or a program described below. The control unit 201 may control the entire apparatus or, alternatively, a plurality of pieces of hardware may control the entire apparatus by sharing processing of the apparatus therebetween.

An imaging unit 202 converts object light of which image is formed by a lens included in the imaging unit 202 into an electric signal, performs noise reduction processing or the like on the converted electric signal, and outputs the resulting digital data as image data. Captured image data is stored in a buffer memory and then subjected to a predetermined calculation by the control unit 201 to be recorded in a recording medium 210.

A nonvolatile memory 203 is an electrically deletable and recordable nonvolatile memory in which, for example, the below described program to be executed by the control unit 201 is stored.

A work memory 204 is used as an image display memory of a display unit 206 and a work area of the control unit 201.

An operation unit 205 is used to receive an instruction input to the cell phone 200 from a user. The operation unit 205 includes operation members, for example, a power button for allowing a user to instruct power ON/OFF of the cell phone 200 and a touch panel formed on the display unit 206.

The display unit 206 displays image data and characters for an interactive operation. The cell phone 200 is not always required to include the display unit 206. The cell phone 200 can connect with the display unit 206 and may include at least a display control function for controlling the display of the display unit 206.

The recording medium 210 can record image data output from the imaging unit 202. The recording medium 210 may be detachably installed in the cell phone 200 or may be built in the cell phone 200. In other word, the cell phone 200 may include at least means for accessing the recording medium 210.

A connection unit 211 is an interface for connecting the cell phone to the external device. The cell phone 200 according to the present exemplary embodiment can exchange data with the digital camera 100 via the connection unit 211. According to the present exemplary embodiment, the connection unit 211 may be an antenna, and the control unit 201 can connect with the digital camera 100 via the antenna.

A public network connection unit 212 is an interface to be used in a public wireless communication. The cell phone 200 can make a call to another device via the public network connection unit 212. At the time, the control unit 201 establishes a call on the cell phone by inputting and outputting audio signals via a microphone 213 and a speaker 214. According to the present exemplary embodiment, the public network connection unit 212 bay be an antenna, and the control unit 201 can connect with the public network via the antenna. The connection unit 211 and the public network connection unit 212 can be realized by a single antenna.

As described above, to the cell phone 200 is structured.

Processing for connecting the digital camera 100 with the cell phone 200 according to the present exemplary embodiment is described below.

As described above, the digital camera 100 according to the present exemplary embodiment can connect with the cell phone 200 via the connection unit 111. Accordingly, image data recorded in the recording medium 110 of the digital camera 100 can be selected and transmitted to the cell phone 200. According to the present exemplary embodiment, in a case where image data is transmitted from the digital camera 100 to the cell phone 200, there are two methods for performing transmission processing. One is for controlling the transmission processing by the operation of the digital camera 100, the other is for controlling the transmission processing by the operation of the cell phone 200.

In a case where the transmission processing is controlled by the operation of the digital camera 100, the following processing is performed. First, image data recorded in the recording medium 110 of the digital camera 100 is displayed on the display unit 106 of the digital camera 100. A user browses the displayed image data to select image data he/she wants to transmit to the cell phone 200 via the operation unit 105. Accordingly, thus selected image data is transmitted from the digital camera 100 to the cell phone 200.

On the other hand, in a case where the transmission processing is controlled by the operation of the cell phone 200, the cell phone 200 acquires image data recorded in the recording medium 110 from the digital camera 100 and displays the acquired image data on the display unit 206 of the cell phone 200. Then, a user browses the displayed image data to select image data he/she wants to transmit from the digital camera 100 via the operation unit 205. Accordingly, the cell phone 200 transmits a transmission request to the digital camera 100. Upon receiving the request, the digital camera 100 transmits the requested image data to the cell phone 200.

Each of the digital camera 100 and the cell phone 200 according to the present exemplary embodiment includes two modes in order to realize the above described processing.

One of the modes of the digital camera 100 is a camera operation mode. In the camera operation mode, the transmission processing can be controlled by the operation of the digital camera 100. In the camera operation mode, the digital camera 100 causes the display unit 106 to display image data recorded in the recording medium 110 in a selectable manner. The user can select the displayed images via the operation unit 105. The user can input an instruction to transmit the selected image data to the cell phone 200 via the operation unit 105.

A mode of the cell phone 200 corresponding to the camera operation mode of the digital camera 100 is referred to as an external device standby mode. In the external device standby mode, the cell phone 200 can receive an image transmitted from the digital camera 100. In the external device standby mode, the transmission processing cannot be controlled via the operation unit 205 of the cell phone 200.

The other one of the modes of the digital camera 100 is a camera standby mode. In the camera standby mode, the user cannot control the transmission processing via the operation unit 105 of the digital camera 100. When the digital camera 100 is in the camera standby mode, the transmission processing is controlled by the operation of the cell phone 200.

A mode of the cell phone 200 corresponding to the camera standby mode is referred to as an external device operation mode. In the external device operation mode, the cell phone 200 receives a thumbnail of image data recorded in the recording medium 110 from the digital camera 100 and displays the thumbnail on the display unit 206 in a selectable manner. Accordingly, the user can select an image while browsing the images of the digital camera 100 with use of the cell phone 200. Then, the user can input a transmission request for causing the digital camera 100 to transmit the selected image. The digital camera 100 in the corresponding camera standby mode transmits the image to the cell phone 200 in response to the request from the cell phone 200.

As described above, in the digital camera 100 and the cell phone 200, the camera operation mode corresponds to the external device standby mode, and the camera standby mode corresponds to the external device operation mode, respectively. In other words, in a case where the transmission processing is controlled by the operation of the digital camera 100, the transmission processing cannot be operated by the cell phone 200, whereas, in a case where the transmission processing is controlled by the operation of the cell phone 200, the transmission processing cannot be operated by the digital camera 100. These modes can be switched while maintaining the correspondences therebetween.

For example, the mode of the cell phone 200 is shifted from the external device standby mode to the external device operation mode, the mode of the digital camera 100 is shifted from the camera operation mode to the camera standby mode. According to the present exemplary embodiment, the digital camera 100 is initially activated in the camera operation mode, whereas the cell phone 200 is initially activated in the external device standby mode. To shift the mode of the cell phone 200 to the external device operation mode, permission from the digital camera 100 is necessary. This is because, for example, there may be a case that a user does not want to release image data to the public when the digital camera 100 of the user is connected to the cell phone 200 of others.

Thus, according to the present exemplary embodiment, a user can perform an operation to select whether to release image data to the public when the digital camera 100 is connected to the cell phone 200. Based on a result of the selection, it is determined whether the cell phone 200 can shift its mode to the external device operation mode. The result of the selection whether to release image data to the public is recorded in the nonvolatile memory 103 of the digital camera 100, and whether to release image data to the public can be automatically determined at the next and subsequent connections. Accordingly, whether to release image data to the public can be determined without requiring the user operation at the second and subsequent connections.

Operations when the digital camera 100 is connected to the cell phone 200 is described below. First, the operation of the digital camera 100 is described below.

Figure 3:
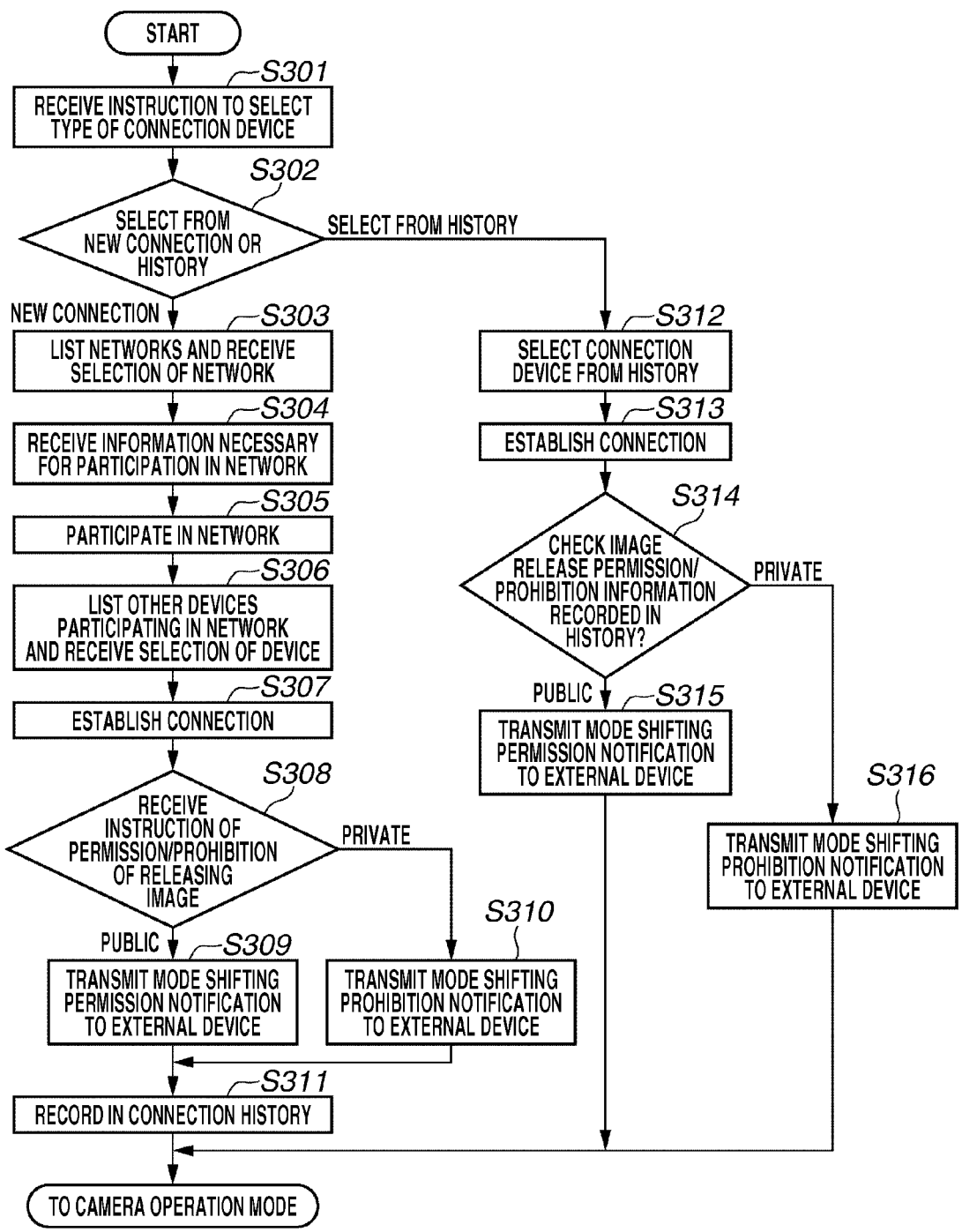
FIG. 3 is a flow chart illustrating an operation of the image processing apparatus according to the first exemplary embodiment.

FIG. 3 is a flow chart illustrating an operation of the digital camera 100 when a connection is established between the digital camera 100 and the cell phone 200. Each processing illustrated in the flow chart in FIG. 3 is realized such that the control unit 101 of the digital camera 100 executes a program recorded in the nonvolatile memory 103 to control each unit of the digital camera 100 according to the program. The processing executed by the digital camera 100 illustrated in the following flow charts are also realized in the similar manner. The processing in the flow chart illustrated in FIG. 3 is started in response to a reception of an instruction to shift, for example, the digital camera 100 to a communication mode from the other mode.

Figure 4A:
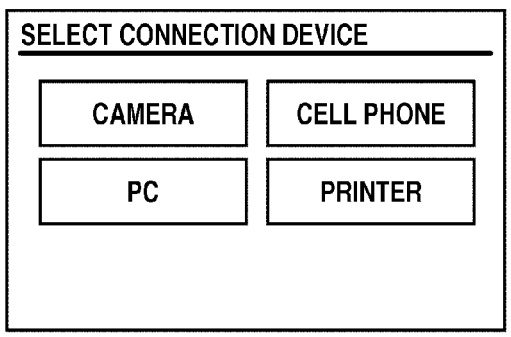
FIGS. 4A through 4F illustrate examples of display of screens of the image processing apparatus according to the first exemplary embodiment, respectively.

In step S301, the control unit 101 receives an instruction to select a type of the device to which the digital camera 100 is connected. For example, the control unit 101 causes the display unit 106 to display a screen as illustrated in FIG. 4A. In the screen, a "camera" button, a "cell phone" button, a "PC" button, and a "printer" button are displayed. The user can input an instruction to select a type of the device to which the digital camera 100 is connected by selecting these buttons via the operation unit 105. For example, in a case where the user uses a touch panel, the control unit 101 receives an instruction corresponding to each button by detecting that the user touches a region at which each button is displayed. The "cell phone" is supposed to be selected here.

Figure 4B:
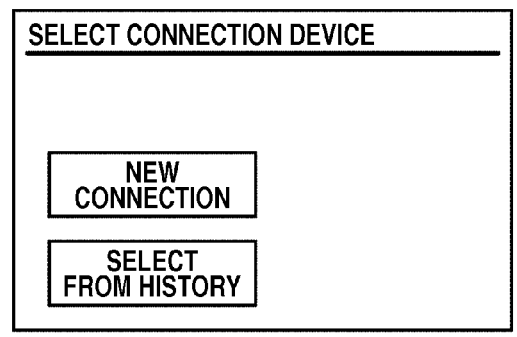

In step S302, the control unit 101 receives an instruction to select whether to search for a device newly connected or to connect with a device once connected. In the processing in step S302, the control unit 101 causes the display unit 106 to display a screen, for example, as illustrated in FIG. 4B. In the screen, two buttons are displayed, namely a "new connection" button for receiving an instruction to search for a device which is newly connected to the digital camera 100 and a "select from history" button for receiving an instruction to connect the digital camera 100 with a device which has been once connected thereto. The user can input an instruction to search for a device to which the digital camera 100 is newly connected by selecting the "new connection" button via the operation unit 105. The user can input an instruction to connect the digital camera 100 with the device once connected by selecting the "select from history" button via the operation unit 105.

First, a case where the control unit 101 determines, in step S302, that an instruction to search for a device to which the digital camera 100 is newly connected is received is described below. In this case (NEW CONNECTION in step S302), the processing proceeds to step S303.

Figure 4C:
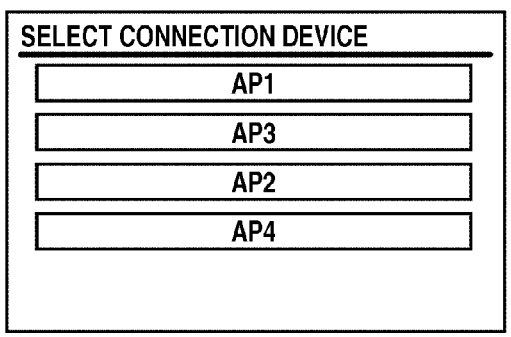

In step S303, the control unit 101 detects networks generated by access points and make a list thereof. At the same time, the control unit 101 receives an instruction to participate in any one of the detected networks. For example, the control unit 101 causes the display unit 106 to display a screen as illustrated in FIG. 4C. In the screen, four access points such as an "AP1", an "AP2", an "AP3", and an "AP4" are listed as extended service set identifiers (ESSIDs) of the detected networks. The user can select the ESSID via the operation unit 105, and the control unit 101 receives an instruction to participate in the network corresponding to the selected ESSID according to the selection of the ESSIDs.

In step S304, the control unit 101 receives an input of information necessary for participating in the selected network. For example, the control unit 101 receives inputs of an encryption key, a method for acquiring an internet protocol (IP) address, settings of a Domain Name System (DNS) server, and the like. The user can input these information pieces via the operation unit 105.

In step S305, the control unit 101 participates in the network using the information received in step S304.

In step S306, the control unit 101 detects other devices participating in the network to list the detected devices. Then, the control unit 101 receives an instruction to select to which device the digital camera 100 is to be connected. More specifically, when the other devices participating in the network are detected, the digital camera 100 transmits information searching for the other devices. The digital camera 100 detects the other devices by receiving information returned as a response from the other devices which have received the information from the digital camera. Information responded from the other devices includes information indicating names and types of the other devices and the like.

Figure 4D:
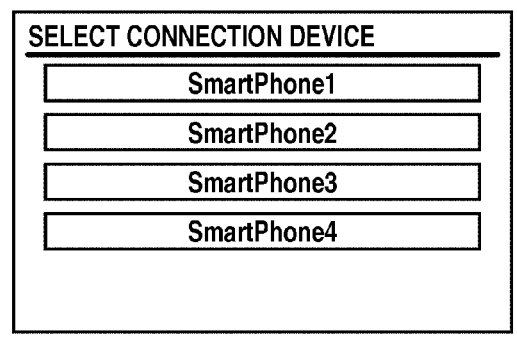

The control unit 101 refers to the device names included in the information to display a screen, for example, as illustrated in FIG. 4D on the display unit 106. The screen includes a list of names (i.e., Smartphone 1 through 4) of the detected devices. Only the device names of the types selected in step S301 are listed here. The list of devices of selected types can be realized such that the control unit 101 compares the types of devices included in the response from the other devices with the types of the devices selected in step S301 and filters objects to be displayed. Names of devices of the types which are not selected in step S301 are not displayed even through the devices are participating in the network. The user can select any name from the device names in the list via the operation unit 105. When the name is selected, the control unit 101 receives an instruction to connect the digital camera 100 with the device having the selected name.

When receiving the instruction to connect the digital camera 100 to the device having the name selected in step S306, in step S307, the control unit 101 connects the digital camera 100 to the device having the selected name. For example, in a case where a name corresponding to the cell phone 200 is selected, the control unit 101 transmits a connection request to the cell phone 200 via the connection unit 111. When the control unit 101 receives a connection accepting signal transmitted from the cell phone 200 In response to the connection request, a communication with the external device is established.

Figure 4E:
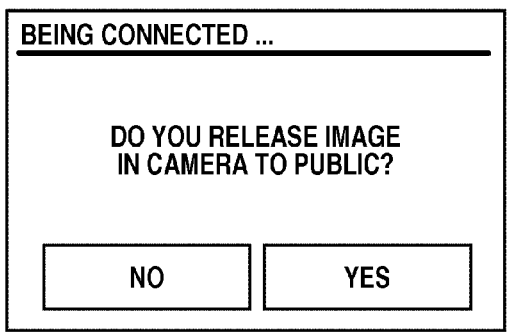

In step S308, the control unit 101 receives an instruction as to whether image data recorded in the recording medium 110 is to be released to the public. More specifically, the control unit 101 causes the display unit 106 to display a screen as illustrated in FIG. 4E. In the example in FIG. 4E, a message indicating "Do you release image in camera to public?" is displayed to prompting the user to input an instruction whether to release the image data to the public. The user can input an instruction by selecting a button from a "YES" button or a "NO" button which are also displayed on the screen via the operation unit 105.

In a case where the control unit 101 determines that the user selects the "YES" button, the control unit 101 determines that the instruction to release image data to the public is received. In this case, the digital camera 100 permits the cell phone 200 browsing of the image data recorded in the recording medium 110 therefrom. In other words, the cell phone 200 is permitted to shift its mode to the external device operation mode. Accordingly, the user of the cell phone 200 can input a transmission request of the image he/she wants to acquire from the digital camera 100 via the operation unit 205 while browsing the image data recorded in the recording medium 110 of the digital camera 100.

On the other hand, in a case where the control unit 101 determines that the user selected the "NO" button, the control unit 101 determines that the instruction not to release image data to the public is received. In this case, the digital camera 100 prohibits the cell phone 200 from browsing the image data recorded in the recording medium 110 therefrom. In other words, the cell phone 200 is prohibited from shifting its mode to the external device operation mode.

In step S308, if the control unit 101 determines that the instruction to release image data to the public is received (PUBLIC in step S308), the processing proceeds to step S309. In step S309, the control unit 101 transmits a mode shifting permission notification to the cell phone 200. The cell phone 200 having received the instruction can receive an instruction to shift the mode thereof from the external device standby mode to the external device operation mode. Thus, the mode of the cell phone 200 can be shifted to the external device operation mode by the operation from the cell phone 200. In other words, image data to be transmitted to the cell phone 200 can be selected by the operation of the cell phone 200 side from image data pieces recorded in the recording medium 110 of the digital camera 100. Processing performed in the cell phone 200 is described below. According to the processing in step S309, the digital camera 100 becomes possible to receive a transmission instruction of an image from the cell phone 200. Then, the processing proceeds to step S311.

On the other hand, in step S308, if the control unit 101 determines that the instruction not to release image data to the public is received (PRIVATE in step S308), the processing proceeds to step S310. In step S310, the control unit 101 transmits a mode shifting prohibition notification to the external device. The cell phone 200 having received the notification cannot receive an instruction input to shift the mode thereof from the external device standby mode to the external device operation mode. Thus, only with the operation from the cell phone 200, the mode of the cell phone 200 cannot be shifted to the external device operation mode. In other words, image data to be transmitted to the cell phone 200 cannot be selected by the operation of the cell phone 200 side from image data pieces recorded in the recording medium 110 of the digital camera 100. Processing performed in the cell phone 200 is described below. According to the processing in step S310, the digital camera 100 can avoid receiving a transmission instruction of an image from the cell phone 200. Then, the processing proceeds to step S311.

In step S311, the control unit 101 records information indicating whether the image data is to be released to the public in a connection history based on the instruction received in step S308.

The connection history is described below. The connection history is a database which stores information used in establishing a connection with the external device for each external device. The database is recorded in the nonvolatile memory 103. According to the present exemplary embodiment, in a case where the digital camera 100 is reconnected to the external device once connected, the control unit 101 refers to the connection history, thereby being able to cause the digital camera 100 to connect to the external device without requiring a user to input information necessary for reconnection therebetween.

FIG. 5 is a conceptual view illustrating an example of data contents of the connection history. Examples of the connection history include, as information used in establishing a connection with the external device, a connection history number, an ESSID, a Basic Service Set Identifier (BSSID), an authentic method, an encryption type, an encryption key, a channel, an Internet Protocol (IP) address acquisition method, a Domain Name System (DNS) acquisition method, a connection device type, a connection device name, a Universally Unique Identifier (UUID), browse permission information, and the like.

For example, in step S308, in a case where the control unit 101 determines that the instruction not to release image data to the public is received, information indicating "prohibition" is recorded in the connection history as browse permission information. The browse permission information recorded here is used when the digital camera reconnects with the external device. This processing is described below. When the processing in step S311 is finished, the mode of the digital camera is shifted to the camera operation mode.

Thus, the processing performed in the case where the control unit 101 determines that the instruction to search for a device to be newly connected to the digital camera 100 is received in step S302 is described above.

Next, a case where the control unit 101 determines, in step S302, that an instruction to establish a connection with a device once connected is received is described below. In this case (SELECT FROM HISTORY in step S302), the processing proceeds to step S312.

Figure 4F:
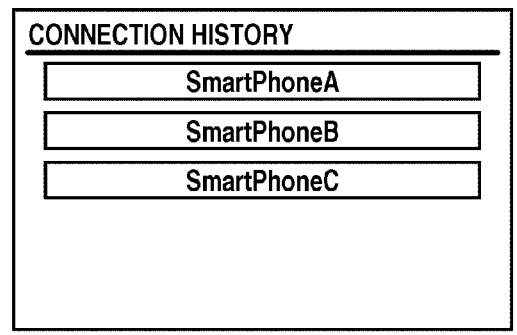

In step S312, the control unit 101 receives an instruction to select a device to be connected among devices once connected. More specifically, the control unit 101 causes the display unit 106 to display a screen as illustrated in FIG. 4F with reference to the connection history. In the screen in FIG. 4, names of external devices which were once connected and thus included in the connection history are displayed. In step S312, the names of the types of the devices selected in step S301 are displayed.

FIG. 4F is an example of display with reference to the connection history in FIG. 5 in a case where the cell phone is selected in step S301. The control unit 101 compares the types selected in step S301 with the "connection type" in the information of the connection history in FIG. 5, and filters objects of which names are to be displayed on the display unit 106 from the information of the connection history. If the cell phone is selected in step S301, the devices having "connection information numbers" 1, 3, and 4 of the connection history in FIG. 5 are determined as the objects of which names are to be displayed.

With respect to the devices determined as the objects of which names are to be displayed, a name of each device is displayed in a manner as illustrated in FIG. 4F with reference to a "name of connection device" of each device. In this example, a "Smartphone A", a "Smartphone B", and a "Smartphone C" corresponding to the devices having the "connection information numbers" 1, 3, and 4 of the connection history are displayed. The user selects the name of the external device to which the user wants to connect the digital camera 100 from these names via the operation unit 105. Subsequently, the user can input an instruction to connect the digital camera 100 with the external device having the selected name.

Then in step S313, a connection with the selected external device is established based on the instruction received in step S312 and the information included in the connection history. The control unit 101 automatically participates in the network using information necessary for participating in the network such as the ESSID included in the connection history. Further, the control unit 101 automatically searches the same network for the selected connection device based on the UUID and establishes connection therewith. Accordingly, the user can save time and effort for inputting information, e.g., ESSID and the selection of the network, necessary for establishing the connection.

When the connection is established in step S313, then in step S314, the control unit 101 refers to the browse permission information included in the connection history to determine whether the selected external device is permitted to browse image data in the past.

In a case where the control unit 101 determines that the selected external device is permitted to browse image data in the past (PUBLIC in step S314), the processing proceeds to step S315. In step S315, processing similar to the processing in step S309 is executed.

On the other hand, in a case where the control unit 101 determines that the selected external device is not permitted to browse image data in the past (PRIVATE in step S314), the processing proceeds to step S316. In step S316, processing similar to the processing in step S310 is executed.

As described above, in a case where the digital camera 100 is reconnected to the external device once connected, the user is not required to select the external device and the external device is selected automatically. Accordingly, in the case of reconnection, the user can save time and effort to input browse permission. Then, the processing in the flow chart in FIG. 3 is finished, and the mode of the digital camera is shifted to the camera operation mode.

The operation of the digital camera 100 when the digital camera 100 is connected to the cell phone 200 is described above. Subsequently, an operation of the digital camera 100 in the camera operation mode is described below.

Figure 6:
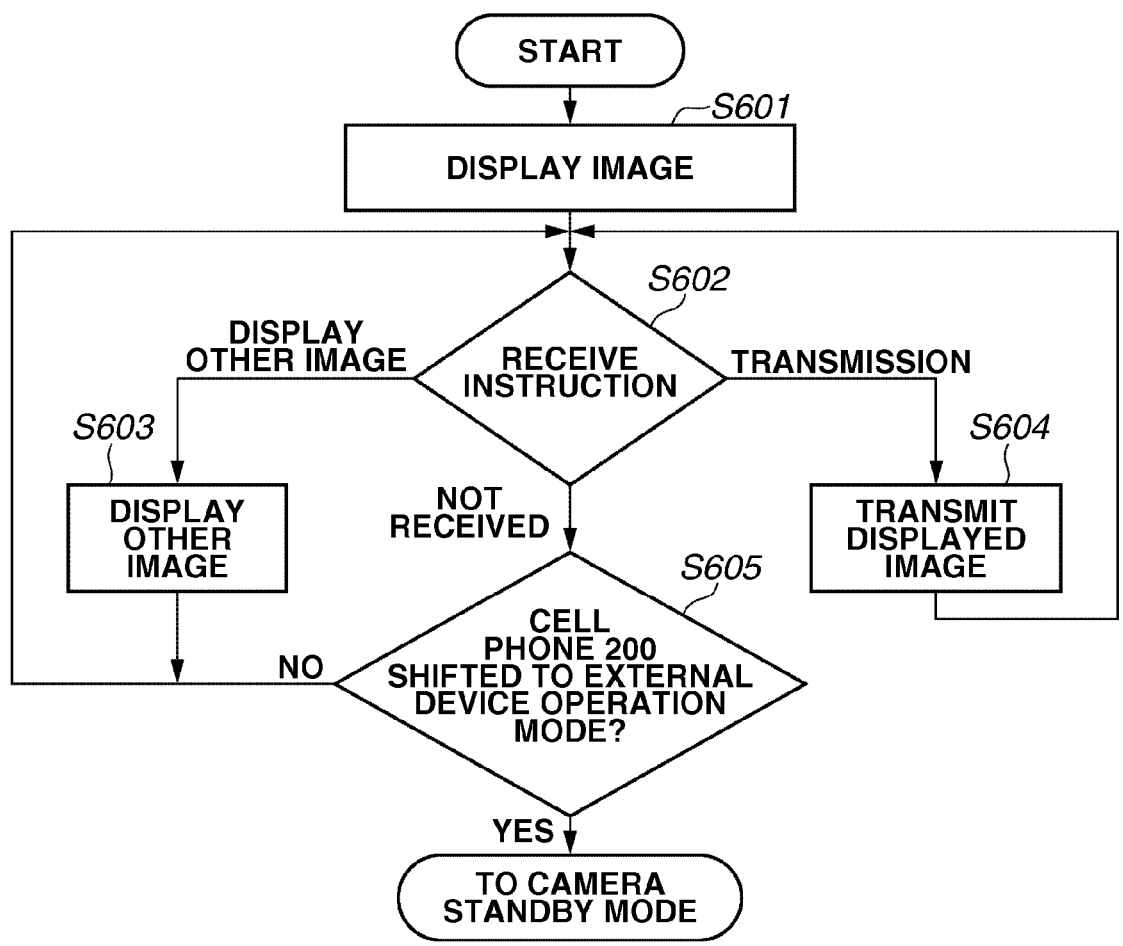
FIG. 6 is a flow chart illustrating an operation of the image processing apparatus according to the first exemplary embodiment.

FIG. 6 is a flow chart illustrating an operation of the digital camera 100 in the camera operation mode. Processing illustrated in the flow chart in FIG. 6 is started in response to the mode shifting of the digital camera 100 to the camera operation mode. When the connection between the digital camera 100 and the cell phone 200 is established, the mode of the digital camera 100 according to the present exemplary embodiment is always firstly shifted to the camera operation mode. Then, the digital camera 100 starts communication with the cell phone 200.

Figure 7:
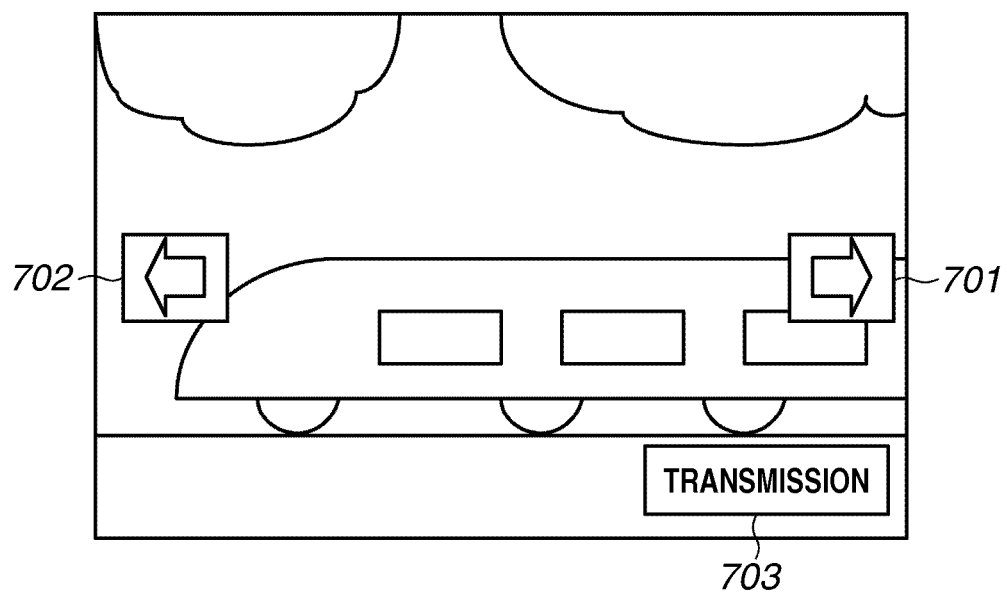
FIG. 7 illustrates an example of display of a screen of the image processing apparatus according to the first exemplary embodiment.

In step S601, the control unit 101 displays the latest image data acquired from the image data pieces recorded in the recording medium 110 on the display unit 106 as well as receives an instruction from the user. The processing in step S601 is executed in parallel with processing in next step S602. FIG. 7 illustrates an example of display of the image data.

In the example in FIG. 7, the image data read out from the recording medium 110 is displayed on the screen. An image advancing button 701 and an image back button 702 for receiving an instruction to display other image data pieces and a transmission button 703 for receiving an instruction to transmit image data currently displayed to the external device are displayed on a screen in a manner superimposing over the image data. The user can input an instruction corresponding to the button by selecting these buttons via the operation unit 105.

In step S602, the control unit 101 determines the instruction received in step S601.

If the control unit 101 determines that an instruction to display the other image data is received (DISPLAY OTHER IMAGE in step S602), the processing proceeds to step S603. In step S603, the control unit 101 reads out image data corresponding to the received instruction from the recording medium 110 and displays the image data on the display unit 106. Then, the processing returns to step S602.

In step S602, if the control unit 101 determines that an instruction to transmit the image data is received (TRANSMISSION in step S602), the processing proceeds to step S604. In step S604, the control unit 101 transmits the image data currently displayed on the display unit 106 to the external device. Then, the processing returns to step S602.

In step S602, if the control unit 101 determines that no instruction is received (NOT RECEIVED in step S602), the processing proceeds to step S605.

In step S605, the control unit 101 determines whether the mode of the cell phone 200 is shifted from the external device standby mode to the external device operation mode. More specifically, the control unit 101 makes the determination by detecting reception of information indicating the mode shifting of the cell phone 200. The information is to be transmitted to the digital camera 100 when the mode of the cell phone 200 is shifted. For example, when the mode is shifted in the cell phone 200, the information indicating the mode shifting is transmitted from the cell phone 200. The digital camera 100 receives and processes the information, and understands that the mode shifting is performed in the cell phone 200. Accordingly, the digital camera 100 can also shift its mode to the corresponding mode in conformity to the mode shifting of the cell phone 200.

In a case where the control unit 101 determines that the mode of the cell phone 200 is not shifted to the external device operation mode (NO in step S605), the processing returns to step S602. On the other hand, in a case where the control unit 101 determines that the mode of the cell phone 200 is shifted from the external device standby mode to the external device operation mode (YES in step S605), the mode of the digital camera 100 is shifted to the camera standby mode in response to the mode shifting of the cell phone 200 to the external device operation mode. The digital camera 100 according to the present exemplary embodiment cannot perform the mode shifting by the operation of the digital camera 100.

The operation of the digital camera 100 in the camera operation mode is described above.

Next, an operation of the cell phone 200 corresponding to the operation of the above described digital camera 100 is described below. First, the operation of the cell phone 200 when the digital camera 100 is connected to the cell phone 200 is described below.

Figure 8:
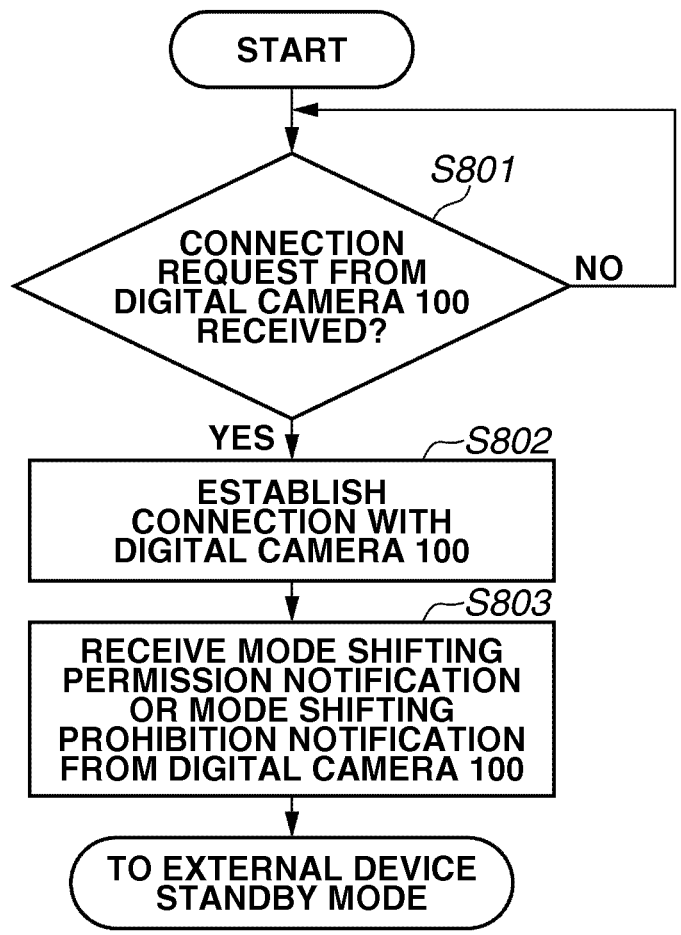
FIG. 8 is a flow chart illustrating an operation of the external device according to the first exemplary embodiment.

FIG. 8 is a flow chart illustrating an operation of the cell phone 200 when a connection is established between the digital camera 100 and the cell phone 200. Each processing illustrated in the flow chart in FIG. 8 is realized such that the control unit 201 of the cell phone 200 executes a program recorded in the nonvolatile memory 203 to control each unit of the cell phone 200 according to the program. The processing executed by the cell phone 200 illustrated in the following flow charts are also realized in the similar manner. The processing in the flow chart illustrated in FIG. 8 is started in response to execution of a predetermined application in the cell phone 200. It is provided that the cell phone 200 has already participated in a network generated by an access point according to a predetermined operation.

In step S801, the control unit 201 determines whether a connection request is received from the digital camera 100. In a case where the control unit 201 determines that no connection request is received (NO in step S801), the processing in step S801 is repeated. On the other hand, in a case where the control unit 201 determines that the connection request is received (YES in step S801), the processing proceeds to step S802.

In step S802, the control unit 201 transmits a connection accepting signal to the digital camera 100 according to the received connection request, so that a connection is established between the cell phone 200 and the digital camera 100.

In step S803, the control unit 201 receives a mode shifting permission notification or a mode shifting prohibition notification from the digital camera 100. The notification received in step S803 is the notification transmitted by the digital camera 100 in step S308 or step S309 in the above described processing in FIG. 3. After receiving either one of the notifications, the mode of the cell phone 200 is shifted to the external device standby mode.

The operation of the cell phone 200 when the connection with the digital camera 100 is established is described above. Subsequently, an operation of the cell phone 200 in the external device standby mode is described below.

Figure 9:
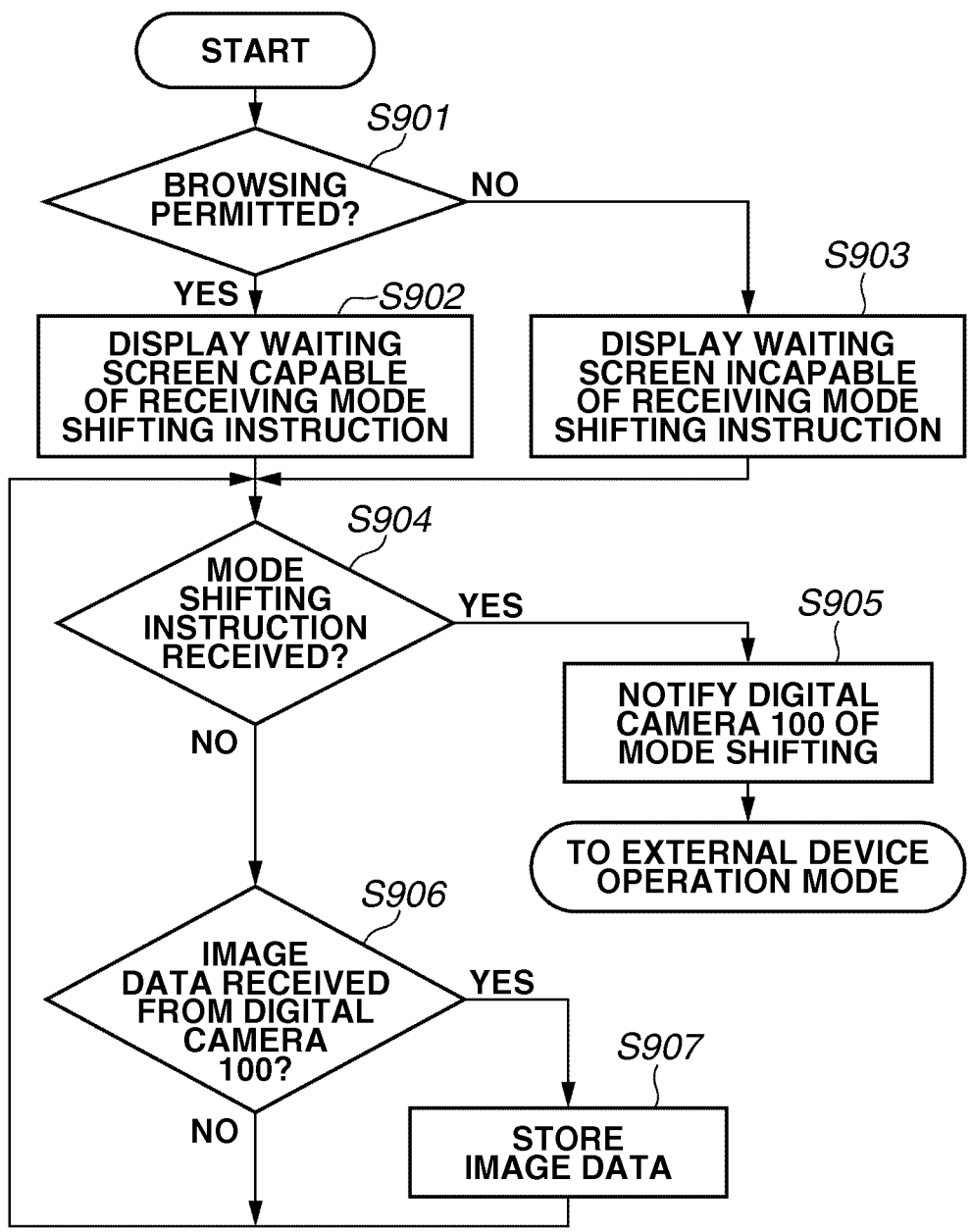
FIG. 9 is a flow chart illustrating an operation of the external device according to the first exemplary embodiment.

FIG. 9 is a flow chart illustrating an operation of the cell phone 200 in the external device standby mode. The processing in the flow chart illustrated in FIG. 9 is started in response to the mode shifting of the cell phone 200 to the external device standby mode. According to the present exemplary embodiment, when the communication is established between the cell phone 200 and the digital camera 100, the cell phone 200 always initially shifts its mode to the external device standby mode and then starts communication with the digital camera 100.

In step S901, the control unit 201 determines whether the browsing of image data of the digital camera 100 is permitted. More specifically, the control unit 201 determines which the mode shifting permission notification or the mode shifting prohibition notification is received from the digital camera 100 in step S803 in FIG. 8.

As described above, the notification is transmitted in response to that the digital camera 100 receives the instruction whether the image data is to be released to the public via the operation unit 105. Therefore, if the control unit 201 determines that the mode shifting permission notification is received from the camera 100, the control unit 201 determines that the digital camera 100 releases the image data to the public. In other words, the control unit 201 determines that the browsing of the image data of the digital camera 100 is permitted.

On the other hand, if the control unit 201 determines that the mode shifting prohibition notification is received from the digital camera 100, the control unit 201 determines that the digital camera 100 does not release the image data to the public. In other words, the control unit 201 determines that the browsing of the image data of the digital camera 100 is not permitted.

In step S901, if the control unit 201 determines that the browsing of the image data of the digital camera 100 is permitted (YES in step S901), the processing proceeds to step S902. In step S902, the control unit 201 displays a screen as illustrated in FIG. 10A on the display unit 206.

Figure 10A:
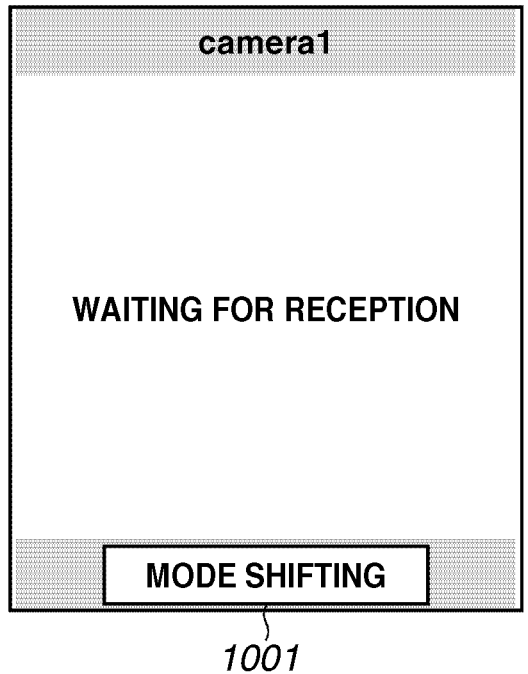
FIGS. 10A and 10B illustrate examples of display of screens of the external device according to the first exemplary embodiment.

In the example in FIG. 10A, a message indicating "waiting for reception" is displayed on the screen. Accordingly, the control unit 201 notifies the user that the cell phone 200 is waiting for reception of the image data transmitted from the digital camera 100. In addition, the screen includes a mode shifting button 1001 for receiving an instruction to shift the mode from the external device standby mode to the external device operation mode. In other words, the control unit 201 displays the screen in FIG. 10A and receives an instruction to cause the cell phone 200 to shift from the external device standby mode to the external device operation mode. The user can input the instruction to shift the mode of the cell phone 200 to the external device operation mode by selecting the button 1001. Accordingly, the cell phone 200 can browse the image data recorded in the recording medium 110 of the digital camera 100.

On the other hand, in step S901, if the control unit 201 determines that the browsing of the image data of the digital camera 100 is not permitted (NO in step S901), the processing proceeds to step S903. In step S903, the control unit 201 displays a screen as illustrated in FIG. 10B on the display unit 206.

Figure 10B:
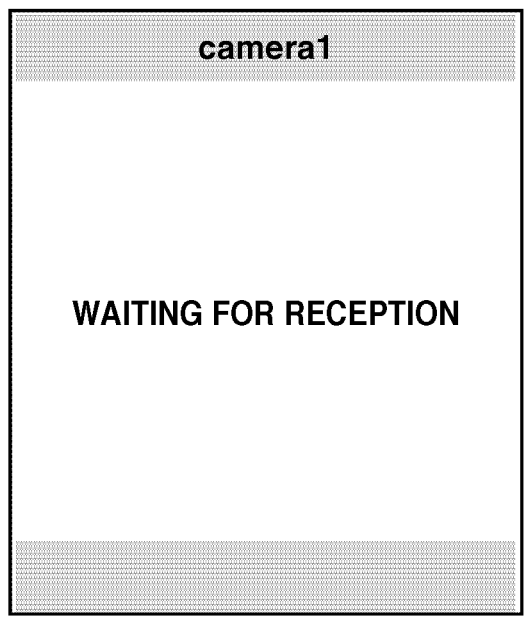

In the example in FIG. 10B, a message indicating "waiting for reception" is displayed on the screen. Accordingly, the control unit 201 notifies the user that the cell phone 200 is waiting for reception of the image data transmitted from the digital camera 100. Different from the screen in FIG. 10A, the button for receiving the instruction to cause the cell phone 200 to shift from the external device standby mode to the external device operation mode is not displayed in the screen in FIG. 10B. In other words, the instruction to shift to the external device operation mode cannot be input via the screen in FIG. 10B. Accordingly, the cell phone 200 is prohibited from browsing the image data recorded in the recording medium 110 of the digital camera 100.

In step S904, the control unit 201 determines whether the instruction to shift the mode of the cell phone 200 from the external device standby mode to the external device operation mode is received.

In a case where the control unit 201 determines that the instruction to shift the mode of the cell phone 200 to the external device operation mode is received (YES in step S904), the processing proceeds to step S905. In a case where the processing in step S904 is executed after the processing in step S903, the mode shifting button 1001 is not displayed on the display unit 206, so that the control unit 201 always determines that the shifting instruction is not received. For example, if the processing in step S903 is executed, the processing may proceed to step S906 by omitting the processing in step S904.

In step S905, the control unit 201 notifies the digital camera 100 that the mode of the cell phone 200 is shifted from the external device standby mode to the external device operation mode. More specifically, the control unit 201 transmits information indicating the mode shifting of the cell phone 200 to the digital camera 100. As described above, the digital camera 100 detects the mode shifting of the cell phone 200 in step S605 in FIG. 6, and the mode of the digital camera 100 is automatically shifted to the mode corresponding to the mode shifting of the cell phone 200. When the processing in step S905 is finished, the mode of the cell phone 200 is shifted to the external device operation mode.

On the other hand, in step S904, if the control unit 201 determines that the instruction to shift the mode of the cell phone 200 from the external device standby mode to the external device operation mode is not received (NO in step S904), the processing proceeds to step S906.

In step S906, the control unit 201 determines whether the image data is received from the digital camera 100. If the control unit 201 determines that no image data is received from the digital camera 100 (NO in step S906), the processing returns to step S904.

On the other hand, if the control unit 201 determines that the image data is received from the digital camera 100 (YES in step S906), the processing proceeds to step S907. The image data received in step S906 is the image data transmitted from the digital camera 100 in the above described processing in step S604 in FIG. 6.

In step S907, the control unit 201 stores the image data received from the digital camera 100 in the recording medium 210. Then, the processing returns to step S904.

The operation of the cell phone 200 in the external device standby mode is described above. Next, an operation of the cell phone 200 in the external device operation mode is described below.

Figure 11:
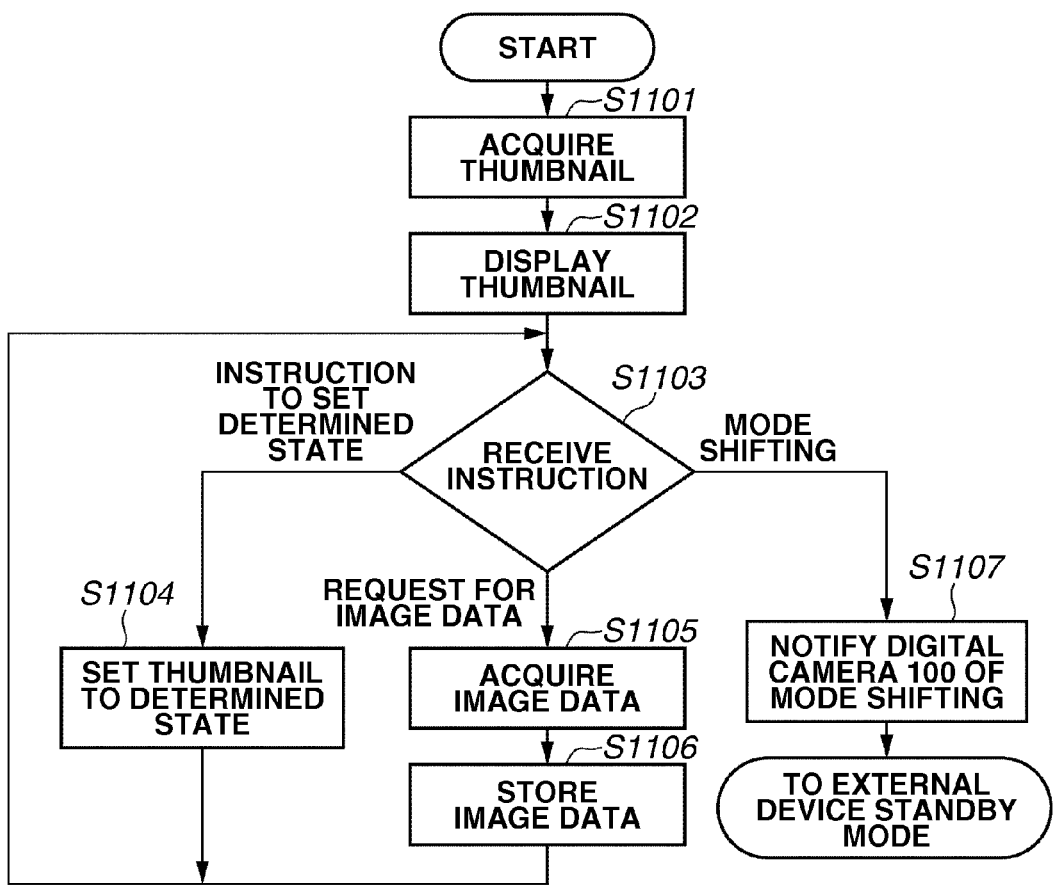
FIG. 11 is a flow chart illustrating an operation of the external device according to the first exemplary embodiment.

FIG. 11 is a flow chart illustrating an operation of the cell phone 200 in the external device operation mode. The processing in the flow chart illustrated in FIG. 11 is started in response to the mode shifting of the cell phone 200 to the external device operation mode.

In step S1101, the control unit 201 acquires a thumbnail of the image data recorded in the recording medium 110 of the digital camera 100 from the digital camera 100. More specifically, the control unit 201 transmits to the digital camera 100 a request for the thumbnail of the image data. In response to the request, the digital camera 100 reads out the thumbnail included in the image data from the recording medium 110 and transmits the read out thumbnail to the cell phone 200. The cell phone 200 receives to acquire the thumbnail.

According to the present exemplary embodiment, image data is dealt in the form of the Exchangeable Image File Format (Exif format), and the control unit 101 of the digital camera 100 reads out the thumbnail recorded in a header portion of the image data as a thumbnail corresponding to the image data. The processing of the digital camera 100 is described below.

Figure 12:
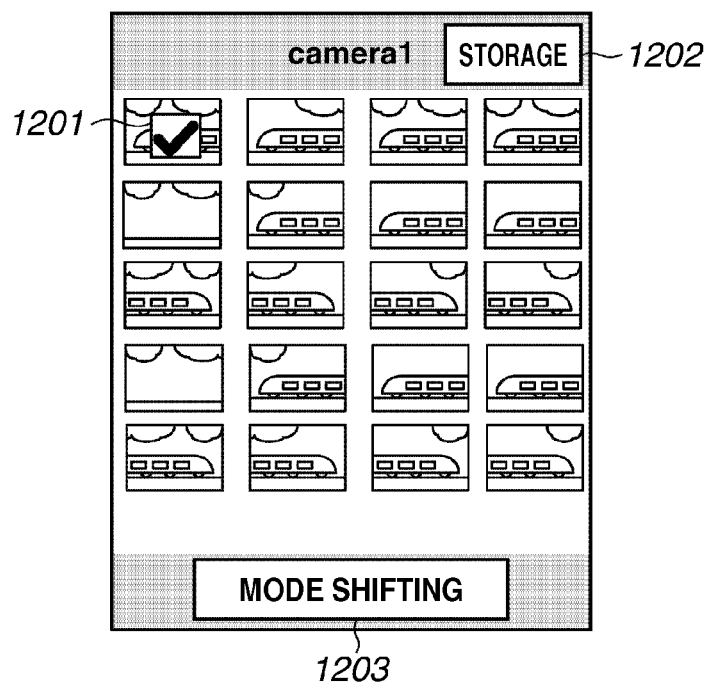
FIG. 12 is an example of display of a screen of the external device according to the first exemplary embodiment.

In step S1102, the control unit 201 causes the display unit 206 to display the thumbnail received in step S1101 thereon and receives an instruction from the user. The processing in step S1102 is executed in parallel with the processing in step S1103. FIG. 12 is an example of a screen displayed according to the processing in step S1102.

In the example in FIG. 12, the thumbnails received from the digital camera 100 are displayed. Accordingly, the user of the cell phone 200 can browse the image data recorded in the recording medium 110 of the digital camera 100 via the display unit 206 of the cell phone 200.

In FIG. 12, a check mark 1201 indicates a determined state of the thumbnail. The determined state is a state that the corresponding image data is determined as an object to be stored in the recording medium 210. In this example, an upper left thumbnail is in the determined state. The user can select any thumbnail from a plurality of displayed thumbnails via the operation unit 205 and input an instruction to put the thumbnail in the determined state. The number of thumbnails which can be put in the determined state is not limited to one, and a plurality of thumbnails can be put in the determined state.

The control unit 201 displays a storage button 1202 for receiving an instruction to acquire and store image data corresponding to the thumbnail in the determined state from the digital camera 100. The user can transmit a request for image data corresponding to the thumbnail in the determined state to the digital camera 100 by selecting the button 1202 via the operation unit 205. In the screen in FIG. 12, a mode shifting button 1203 for receiving an instruction to shift the mode of the cell phone 200 to the external device standby mode is displayed. The user selects the mode shifting button 1203 and thus can input an instruction to shift the mode of the cell phone 200 to the external device standby mode.

In step S1103, the control unit 201 determines the instruction received in step S1102.

If the control unit 201 determines that an instruction to put the thumbnail in the determined state is received (INSTRUCTION TO SET DETERMINED STATE in step S1103), the processing proceeds to step S1104. In step S1104, the thumbnail which is the object of the received instruction is put into the determined state. Then, the processing returns to step S1103.

In step S1103, if the control unit 201 determines that an instruction to store image data corresponding to the thumbnail in the determined state in the recording medium 210 (REQUEST FOR IMAGE DATA in step S1103), the processing proceeds to step S1105. In step S1105, the control unit 201 acquires image data corresponding to the thumbnail in the determined state from the digital camera 100.

Then in step S1106, the control unit 201 stores the acquired image data in the recording medium 210. Then, the processing returns to step S1103.

In step S1103, if the control unit 201 determines that an instruction to shift the mode of the cell phone 200 from external device operation mode to the external device standby mode is received (MODE SHIFTING in step S1103), the processing proceeds to step S1107. In step S1107, the control unit 201 notifies the digital camera 100 that the mode of the cell phone 200 is shifted from the external device operation mode to the external device standby mode. More specifically, the control unit 201 transmits information indicating the mode shifting of the cell phone 200 to the digital camera 100. The digital camera 100 detects the mode shifting of the cell phone 200 in the above described step S605 in FIG. 6, and the mode of the digital camera 100 is automatically shifted to the mode corresponding to the mode shifting of the cell phone 200. When the processing in step S1107 is finished, the mode of the cell phone 200 is shifted to the external device standby mode.

The operation of the cell phone 200 in the external device operation mode is described above.

Subsequently, an operation of the digital camera 100 in the camera standby mode corresponding to the operation of the cell phone 200 in the external device operation mode is described below.

Figure 13:
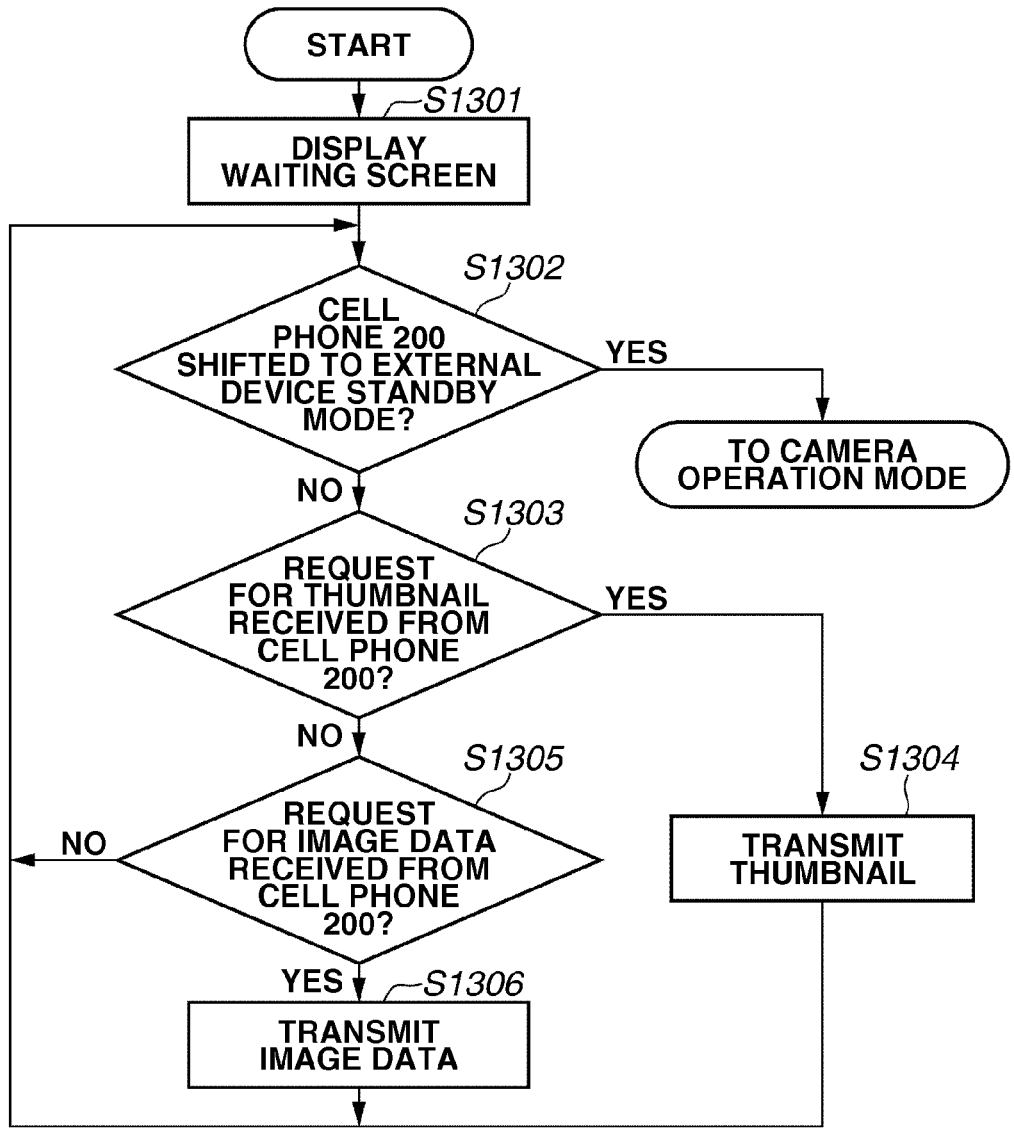
FIG. 13 is a flow chart illustrating an operation of the image processing apparatus according to the first exemplary embodiment.

FIG. 13 is a flow chart illustrating an operation of the digital camera 100 in the camera standby mode. The processing in the flow chart illustrated in FIG. 13 is started in response to the mode shifting of the digital camera 100 to the camera standby mode.

Figure 14:
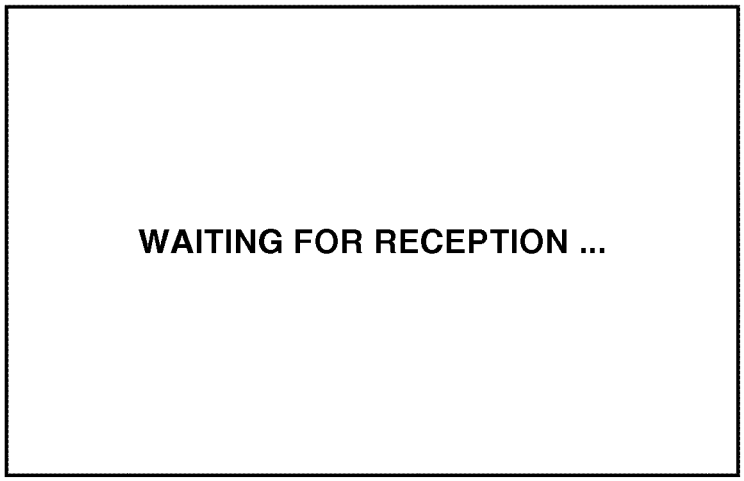
FIG. 14 is an example of display of a screen of the image processing apparatus according to the first exemplary embodiment.

In step S1301, the control unit 101 causes the display unit 106 to display a screen as illustrated in FIG. 14. In the example in FIG. 14, a message indicating "waiting for reception" is displayed on the screen.

In step S1302, the control unit 101 determines whether the mode of the cell phone 200 is shifted from the external device operation mode to the external device standby mode. More specifically, the control unit 101 determines the mode shifting of the cell phone 200 according to reception of the information indicating the mode shifting of the cell phone 200 transmitted to the digital camera 100 from the cell phone 200 in step S1107 in FIG. 11.

If the control unit 101 determines that the mode of the cell phone 200 is shifted from the external device operation mode to the external device standby mode (YES in step S1302), the mode of the digital camera 100 is shifted to the camera operation mode. The mode of the digital camera 100 according to the present exemplary embodiment cannot be shifted to the camera operation mode by the operation of the digital camera 100.

On the other hand, if the control unit 101 determines that the mode of the cell phone 200 is not shifted from the external device operation mode to the external device standby mode (NO in step S1302), the processing proceeds to step S1303.

In step S1303, the control unit 101 determines whether a request for the thumbnail included in the image data is received from the cell phone 200. In a case where the control unit 101 determines that the request for the thumbnail included in the image data is received from the cell phone 200 (YES in step S1303), the processing proceeds to step S1304.

In step S1304, the control unit 101 transmits the thumbnail of the image data to the cell phone 200 in response to the request. Then, the processing returns to step S1302.

On the other hand, in a case where the control unit 101 determines that the request for the thumbnail is not received from the cell phone 200 (NO in step S1303), the processing proceeds to step S1305.

In step S1305, the control unit 101 determines whether the request for the image data is received from the cell phone 200. In a case where the control unit 101 determines that the request for the image data is received from the cell phone 200 (YES in step S1305), the processing proceeds to step S1306.

In step S1306, the control unit 101 reads out the image data corresponding to the request from the recording medium 110 and transmits the read out image data to the cell phone 200. Then, the processing returns to step S1302.

The operation of the digital camera 100 in the camera standby mode is described.

As described above, permission or prohibition of the mode shifting in the cell phone 200 is controlled according to an instruction received by the digital camera 100. The permission or prohibition of the mode shifting is, as described in FIG. 3, selected by the user at the time of the first connection and is automatically selected on and after the second connection. Accordingly, the permission or prohibition of the release of image data to the public can be flexibly selected according to the external device to be connected as well as the user can save time and effort to select the permission or prohibition thereof every time.

According to the above described first exemplary embodiment, an example that the mode of the digital camera 100 is initially shifted to the camera operation mode is described. According to a second exemplary embodiment, a configuration which automatically determines a mode of operation according to a type of an external device is described.

Since the present exemplary embodiment is common with the first exemplary embodiment in many portions, descriptions of the portions common with those of the first exemplary embodiment are omitted, and the portions unique to the present exemplary embodiment are mainly described below.

Figure 15:
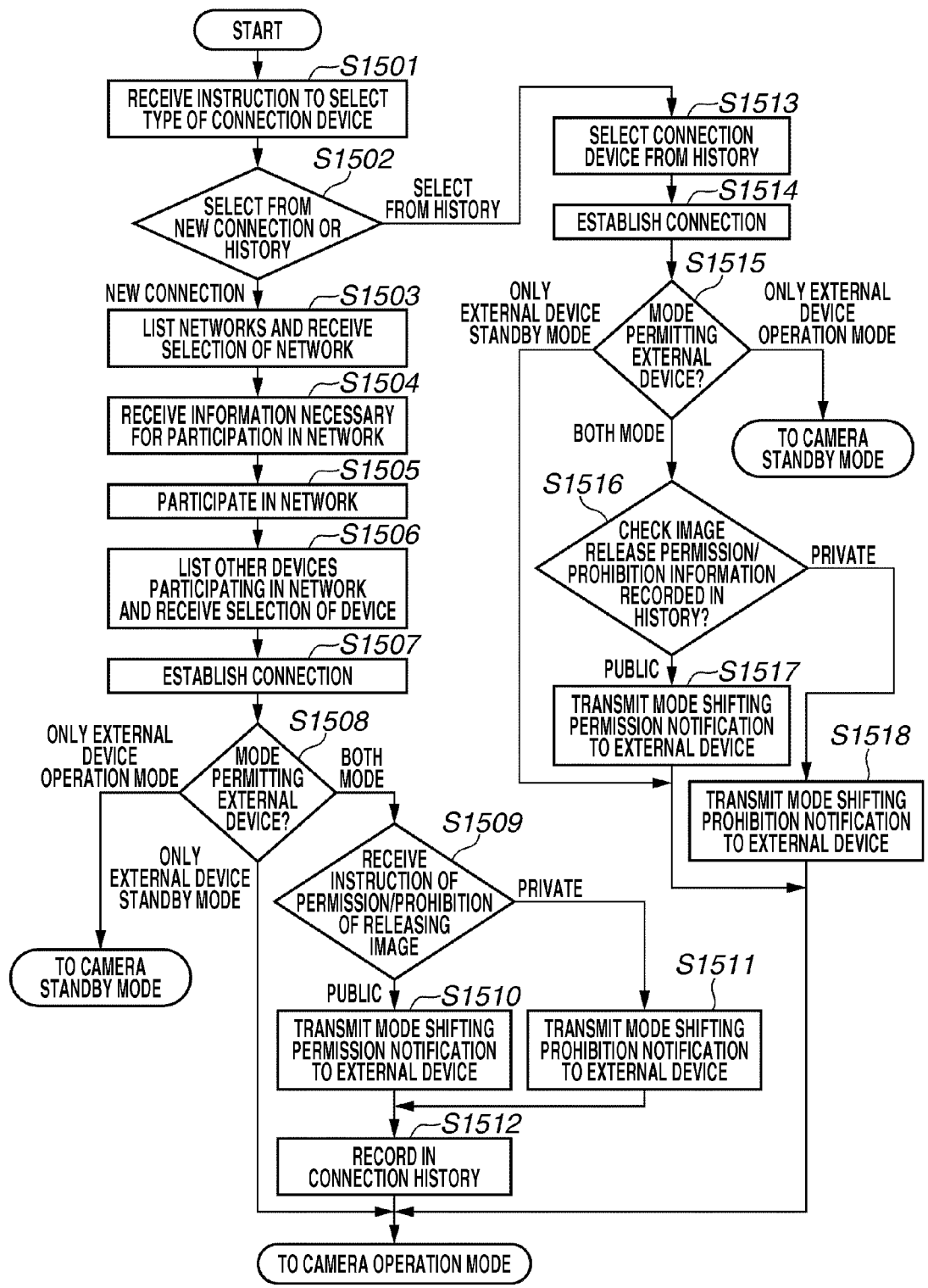
FIG. 15 is a flow chart illustrating an operation of an image processing apparatus according to a second exemplary embodiment.

FIG. 15 is a flowchart illustrating an operation when a communication is established between a digital camera 100 according to the present exemplary embodiment and an external device.

Descriptions of processing in steps S1501 through S1507 are omitted here since the processing is similar to the processing in steps S301 through S307 in FIG. 3.

In step S1508, the control unit 101 determines, according to a type of a device to be connected, a mode permitted to the external device between which the connection is established. More specifically, a database in which the type of the external device is preliminary associated with the mode to be permitted, i.e., the external device operation mode or the external device standby mode, is stored in the nonvolatile memory 103. Then, the control unit 101 determines the mode to be permitted to the external device in reference to the database.

FIG. 16 is a conceptual view illustrating contents of the database. In the example in FIG. 16, in a case where the external device is a digital camera, shifting to the external device operation mode is prohibited and only shifting to the external device standby mode is permitted. In a case where the external device is a personal computer (PC), only the external device operation mode is permitted. In a case where the external device is a cell phone, both of shifting to the external device operation mode and shifting to the external device standby mode are permitted in the processing. In addition, whether the external device is finally permitted to be shifted to the external device operation mode is determined according to the selection by the user and information of the connection history as described in the first exemplary embodiment.

The above settings are made according to the following reasons. For example, in a case where the digital camera 100 is connected to another digital camera, i.e., in a case where the external device is a digital camera, it is highly possible that the digital camera as the external device is not a user's own digital camera. This is because a case that a sole user has two digital cameras and connects those cameras via a wireless connection to exchange data to each other does not occur so often. Therefore, in a case where the external device is a digital camera, only the external device standby mode is permitted, and browsing of images from users of the other digital cameras is limited.

On the other hand, in a case where the digital camera 100 is connected to the PC, only the external device operation mode is permitted to the PC. This is because a user can generally operate the interface of the PC easier than the interface of the digital camera. In a case where the digital camera 100 is connected to the PC, another reason to permit only the external device operation mode to the PC is that the user of the PC tends to be the same person as the user of the digital camera.

In a case where the digital camera 100 is connected to a cell phone, both of a case that the digital camera 100 is connected to the user's own cell phone and a case that the digital camera 100 is connected to the cell phone of another user are highly possibly supposed. Therefore, in a case where the external device is a cell phone, both of the external device operation mode and the external device standby mode are permitted to the cell phone. These settings may be editable by the user at will. The type of the external device may be referred to the result of the selection in step S1501 or may be acquired relating information from the external device to which the connection is established. According to the present exemplary embodiment, an example that a determination is made according to the database in FIG. 16 is described.

In step S1508, in a case where the control unit 101 determines that only the external device operation mode is permitted, the processing in the flow chart in FIG. 15 is terminated, and the mode of the digital camera 100 is shifted to the camera standby mode. In the example in FIG. 16, in a case where the control unit 101 determines that the external device is a PC, the processing in the flow chart in FIG. 16 is terminated, and the mode of the digital camera 100 is shifted to the camera standby mode. This mode shifting is automatically performed without the selection operation by the user. Whereas, the mode of the external device is automatically shifted to the external device standby mode.

On the other hand, in step S1508, in a case where the control unit 101 determines that only the external device standby mode is permitted, the processing in step S1508 is terminated, and the mode of the digital camera 100 is shifted to the camera operation mode. In other words, in a case where the control unit 101 determines that the external device is the other digital camera, the processing in step S1508 is terminated, and the mode of the digital camera 100 is shifted to the camera operation mode. In other words, the mode of the digital camera 100 is automatically shifted without the selection operation by the user. On the other hand, the mode of the external device is automatically shifted to the external device standby mode.

With the above described processing, in a case where a connection is established with a device to which only one of the modes is permitted, the user can save time and effort to select the operation mode.

In step S1508, in a case where the control unit 101 determines that both of the external device operation mode and the external device standby mode are permitted, the processing proceeds to step S1509. In the other words, in a case where the control unit 101 determines that the external device is the other cell phone, the processing proceeds to step S1509.

In this case, the processing is proceeded in a similar manner as that of the first exemplary embodiment. The processing in steps S1509 through S1512 is similar to the processing in steps S308 through S311 in FIG. 3, so that a description thereof is omitted here.

In steps S1513 and S1514, processing similar to that in steps S312 and S313 in FIG. 3 is executed.

In step S1515, processing similar to that in step S1508 is executed.

In step S1515, in a case where the control unit 101 determines that only the external device operation mode is permitted, the processing in step S1515 is terminated, and the mode of the digital camera 100 is shifted to the camera standby mode. On the other hand, the mode of the external device is shifted to the external device operation mode.

In step S1515, in a case where the control unit 101 determines that only the external device standby mode is permitted, the processing in step S1515 is terminated, and the mode of the digital camera 100 is shifted to the camera operation mode. On the other hand, the mode of the external device is shifted to the external device standby mode.

In step S1515, in a case where the control unit 101 determines that both of the external device operation mode and the external device standby mode are permitted, the processing proceeds to step S1516. The processing in steps S1516 through S1518 is similar to that in steps S314 through S316 in FIG. 3, so that descriptions thereof are omitted here.

The operation of the digital camera 100 when the digital camera 100 according to the present exemplary embodiment establishes a connection with an external device is described above.

A configuration in which the mode to be shifted to can be automatically determined according to a type of the external device is described according to the present exemplary embodiment. According to this configuration, user's time and effort in connection of devices can be reduced.

According to the above described second exemplary embodiment, in a case where connection is established with an external device to which both of the external device operation mode and the external device standby mode are permitted, an example that the mode of the digital camera 100 is initially shifted to the camera operation mode is described. The second exemplary embodiment may be configured to store the mode of the digital camera 100 when the digital camera 100 is disconnected from the external device and cause the digital camera 100 to automatically shift to the stored mode in the next and subsequent connections. In this case, the digital camera 100 notifies the external device of the mode that the digital camera 100 operates so as to allow the external device to operate in the mode corresponding to the mode the digital camera 100 shifts to. Accordingly, the mode can be automatically shifted to the prior mode without requiring the operation of the user, resulting in improvement of user-friendliness.

According to the above described exemplary embodiments, regardless of which is instructed with respect to whether image data is released to the public, the mode to which the digital camera 100 shifts is the camera operation mode. In this regard, the mode of the digital camera 100 may be shifted to the camera standby mode in a case where the instruction to release image data to the public is received, whereas the mode of the digital camera 100 may be shifted to the camera operation mode in a case where the instruction not to release image data to the public is received.

Further, according to the above described exemplary embodiments, the configuration that the mode of the digital camera 100 cannot be shifted by the operation in the digital camera 100 is described. However, the digital camera 100 may be configured to receive an instruction of mode shifting. In this configuration, in a case where the digital camera 100 is connected to an external device of which mode can be shifted only to either one of the external device operation mode and the external device standby mode, the digital camera 100 may be configured not to receive an instruction of mode shifting.

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-022152 filed Feb. 3, 2012, which is hereby incorporated by reference herein in its entirety.

What is claimed is:

1. An image processing apparatus comprising:
a communication unit configured to communicate with an external device; and
a CPU configured to control process for transmitting via the communication unit one or more images recorded in a recording medium to the external device,
wherein the CPU shifts a mode between an operation mode for receiving an instruction from the user to transmit one or more images to the external device and a standby mode for receiving an instruction from the external device to transmit one or more images to the external device,
wherein the CPU selects based on a user operation whether to permit transmitting one or more images to the external device in the standby mode,
wherein the CPU determines a type of the external device, and
wherein, after the CPU determines that the type of the external device is a second type, the CPU receives the user operation for selecting whether to permit transmitting one or more images to the external device whose type is the second type in the standby mode and the CPU enables transmission of one or more images to the external device whose type is the second type via the communication unit after the user operation for selecting whether to permit transmitting one or more images to the external device whose type is the second type in the standby mode is received, and the CPU determines that the type of the external device is a first type, the CPU enables transmission of one or more images to the external device whose type is the first type via the communication unit in a mode associated with the first type without receiving an user operation for selecting whether to permit transmitting one or more images to the external device whose type is the first type in the standby mode.

2. The image processing apparatus according to claim 1, wherein a result of selection whether to permit transmitting one or more images to the external device whose type is the second type in the standby mode is transmitted to the external device via the communication unit.

3. The image processing apparatus according to claim 1, wherein, in a case where the CPU selects permission of transmitting one or more images to the external device whose type is the second type in the standby mode, the CPU enables transmission of an image to the external device in the operation mode.

4. The image processing apparatus according to claim 1, wherein, in a case where the CPU selects not to permit transmitting one or more images to the external device whose type is the second type in the standby mode, the CPU does not enable transmission of an image to the external device in the standby mode.

5. The image processing apparatus according to claim 1, wherein a mode associated with the first type is the standby mode.

6. The image processing apparatus according to claim 5, wherein, in a case where the type of the external device is determined as a third type, the CPU enables transmission of one or more images to the external device in the operation mode without the user operation whether to permit transmitting one or more images to the external device whose type is the third type in the standby mode.

7. The image processing apparatus according to claim 6, wherein, in a case where the external device is a digital camera, the CPU determines that the type of the external device is the third type.

8. The image processing apparatus according to claim 1, wherein, in a case where the external device is a personal computer, the CPU determines that the type of the external device is the first type.

9. The image processing apparatus according to claim 1, wherein a mode associated with the first type is the operation mode.

10. The image processing apparatus according to claim 9, wherein, in a case where the external device is a digital camera, the CPU determines that the type of the external device is the first type.

11. The image processing apparatus according to claim 1, wherein, in a case where the external device is a cell phone, the CPU determines that the type of the external device is the second type.

12. The image processing apparatus according to claim 1, wherein,
a result of selection whether to permit transmitting one or more images to the external device whose type is the second type in the standby mode is stored in the recording medium per the external device, and
CPU automatically selects whether to permit transmitting one or more images to the external device whose type is the second type in the standby mode based on the result stored in the recording medium.

13. The image processing apparatus according to claim 12, wherein, in a case where the CPU automatically selects permission of transmitting one or more images to the external device whose type is the second type in the standby mode, the CPU enables transmission of one or more images to the external device in a mode at the time when last connection with the external device is disconnected.

14. The image processing apparatus according to claim 12, wherein a result of automatic selection based on the result stored in the recording medium is not stored in the recording medium.

15. The image processing apparatus according to claim 1, wherein, in a case where the CPU selects permission of transmitting one or more images to the external device whose type is the second type in the standby mode, the CPU enables shifting a mode between the operation mode and the standby mode according to an instruction from the external device whose type is the second type.

16. The image processing apparatus according to claim 1, wherein the CPU shifts a mode between the operation mode and the standby mode according to an instruction from the user.

17. The image processing apparatus according to claim 1, wherein, in a case where the CPU selects permission of transmitting one or more images to the external device whose type is the second type in the standby mode and the image processing apparatus is in the operation mode, an operation to put the image processing apparatus in the standby mode becomes effective in the external device, and
wherein, in a case where the CPU selects prohibition of transmitting one or more images to the external device whose type is the second type in the standby mode and the image processing apparatus is in the operation mode, an operation to put the image processing apparatus in the standby mode is not accepted by the external device.

18. A method for controlling an image processing apparatus, the method comprising:
communicating with an external device;
receiving a user operation via an operation unit, wherein the controlling step shifting a mode between an operation mode for receiving an instruction from the user via the operation unit to transmit one or more images to the external device and a standby mode for receiving an instruction from the external device to transmit one or more images to the external device;
determining a type of the external device;
after the type of the external device is determined as a second type, receiving the user operation for selecting whether to permit transmitting one or more images to the external device in the standby mode;
enabling transmission of one or more images to the external device whose type is the second type after the user operation for selecting whether to permit transmitting one or more images to the external device in the standby mode is received; and
after the type of the external device is determined as a first type, enabling transmission of one or more images to the external device whose type is the first type in a mode associated with the first type without receiving the user operation for selecting whether to permit transmitting one or more images to the external device in the standby mode.

19. A non-transitory computer-readable storage medium storing a program that causes a computer to perform a method, the method comprising:
communicating with an external device;
receiving a user operation via an operation unit;
shifting a mode between an operation mode for receiving an instruction from the user via the operation unit to transmit one or more images to the external device and a standby mode for receiving an instruction from the external device to transmit one or more images to the external device;
determining a type of the external device;
after the type of the external device is determined as a second type, receiving the user operation for selecting whether to permit transmitting one or more images to the external device in the standby mode;
enabling transmission of one or more images to the external device whose type is the second type after the user operation for selecting whether to permit transmitting one or more images to the external device in the standby mode is received; and
after the type of the external device is determined as a first type, enabling transmission of one or more images to the external device whose type is the first type in a mode associated with the first type without receiving the user operation for selecting whether to permit transmitting one or more images to the external device in the standby mode.

* * * * *